HALL DEVICE CONSTRUCTION

Filed Oct. 4, 1962 2 Sheets-Sheet 1

INVENTORS.
RICHARD W. FREYTAG
JOSEPH W. GRATIAN
BY
ATTORNEY

HALL DEVICE CONSTRUCTION

United States Patent Office 3,134,083
Patented May 19, 1964

3,134,083

HALL DEVICE CONSTRUCTION

Richard W. Freytag, Pittsford, and Joseph W. Gratian, Rochester, N.Y., assignors to General Dynamics Corporation, Rochester, N.Y., a corporation of Delaware Filed Oct. 4, 1962, Ser. No. 228,301
5 Claims. (Cl. 338—32)

This invention relates to Hall-effect devices and is particularly directed to methods and means for manufacturing such devices with a view to increasing the Hall voltage and to decreasing the noise factor of the Hall device.

The Hall-effect device comprises a wafer or flat crystal of semi-conductor material to one axis of which is applied a direct current voltage, to another axis of which is applied a magnetic field, and from the third axis of which is obtained a voltage which is a function of the direct current and the magnetic field. The semiconductor material may be of many types, the principal requisite of which is a characteristic of high electron or carrier mobility. It has been demonstrated that the output or Hall voltage V*o*, is proportional to $RIH/t$ where R is the Hall constant of the semiconductor material measured in volt-centimeters per unit of ampere-gauss, I is the transverse direct current, H is the magnetic field in gauss, and $t$ is the thickness of the wafer in the direction of the magnetic field. It appears, therefore, that for a given material with given I and H, the thickness $t$ must be reduced to the smallest possible dimension. From the standpoint of electrical properties, indium arsenide (InAs) or indium antimonide (InSb) are at present among the more satisfactory semiconductors for Hall-effect applications. Unfortunately, these materials are physically brittle and it is difficult to avoid excessive breakage when the crystals are ground or lapped to a thickness of less than a few mils.

No satisfactory technique has as yet been developed for making electrical connections to the edges of such small semiconductors, the usual soldering techniques leaving much to be desired. A still further disadvantage of conventional Hall-effect devices is the relatively high noise-to-signal ratio in the output circuit of the crystal.

An object of this invention is to provide an improved Hall-effect device which is easy to manufacture and overcomes the above-mentioned disadvantages.

A more specific object of this invention is to provide an improved Hall-effect device in which the thickness, $t$, of the crystal may be made thin without breakage and in which the output Hall voltage is high with a low noise factor.

The objects of this invention are attained by adhesively applying a semiconductor wafer to one pole face and then lapping the wafer to the desired thinness while supported upon that pole face. Alternatively, the semiconductor material may be deposited on the pole face in a vacuum by evaporation and condensation techniques to obtain thicknesses in the micron range. Next, the output leads connected to one pair of edges of the Hall crystal are disposed in a plane parallel to the magnetic field of the crystal. The $dH/dt$ voltage caused by varying magnetic field can induce no voltages in the output leads.

Other objects and features of this invention will become apparent to those skilled in the art by referring to the specific embodiments described in the following specification and shown in the accompanying drawings, in which.

Figure 1:
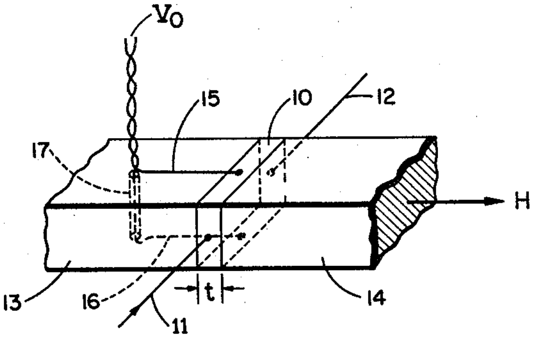
FIG. 1 is a perspective partly-sectioned view of a Hall-effect device constructed according to this invention.

In FIG. 1 is shown at 10 a semiconductor of general wafer shape of indium arsenide or indium antimonide or other semiconductor material suitable for generating a Hall voltage. The wafer shown is generally rectangular in outline and to opposite ends of the wafer are connected lead wires 11 and 12 to which may be applied a direct current voltage. To opposite faces of the wafer are pressed the faces of pole pieces 13 and 14, to apply field H perpendicularly to the faces of the wafer. The wafer has thickness $t$.

The Hall voltage is sensed at opposite edges of the wafer on a line orthogonal to the direction of the direct current I and to the direction of the field H. The lead wires 15 and 16 for the output Hall voltage are, according to an important feature of this invention, disposed along the pole piece 13 in a plane parallel to the field H. A drilled hole 17, also disposed in said plane, is provided through pole piece 13 for lead wire 16 so that at one end of the hole the two lead wires may be twisted or laid closely together. It has been found that lead wires thus disposed comprise a loop which is immune to changes in the magnetic field H, and that the Hall voltage V*o*, contains no component induced by $dH/dt$. The signal-to-noise ratio is favorable.

Figure 2:
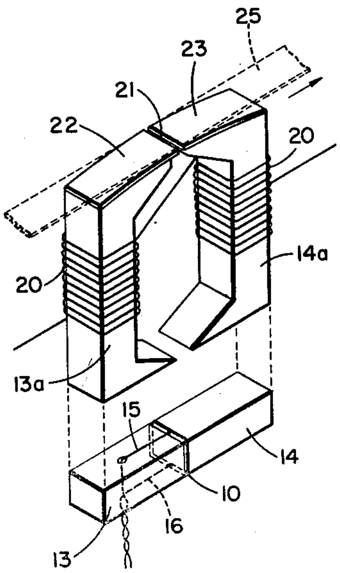
FIG. 2 is a partly-exploded recording head, with read-in and read-out facilities, constructed according to this invention.

FIG. 2 shows one practical embodiment of the device of this invention which is easy to manufacture. The pole pieces 13 and 14 are fabricated as suggested in FIG. 1 with the semiconductor wafer 10 deposited on one pole and clamped between the two pole faces. Magnetic field H is applied to the pole pieces 13 and 14 by the armatures **13*a* and 14*a*, to which may be wound coil 20 for recording signals on a tape. A second or front gap 21 is provided by thin iron plates 22 and 23 attached in good magnetic contact with the upper ends of the armatures 13*a* and 14*a*. Members 22 and 23 are separated at gap 21 by a thin coating of SiO or other suitable non-magnetic material to assure a fixed gap of high resolution which will record information on or respond to information magnetically recorded on the tape 25 drawn across the gap 21. The interfaces of the iron-parts of the magnetic circuit should be machined and polished for good contact and reduced reluctance. Lead wires 15 and 16 are laid out on the face of pole piece 13**, one wire being passed through a drilled or cast hole in the piece so that the loop thus formed lies in a plane parallel to the direction of the magnetic field and is, hence, noninductive with respect to that field.

The reduced dimensions of the front gap 21 in the direction of tape travel means high resolving power of the gap. The reduced dimension of the gap perpendicular to the tape measured by the thickness of the pole pieces 22 and 23 reduces the amount of shunting of the available flux produced in the gap by the magnetized tape.

Figure 3:
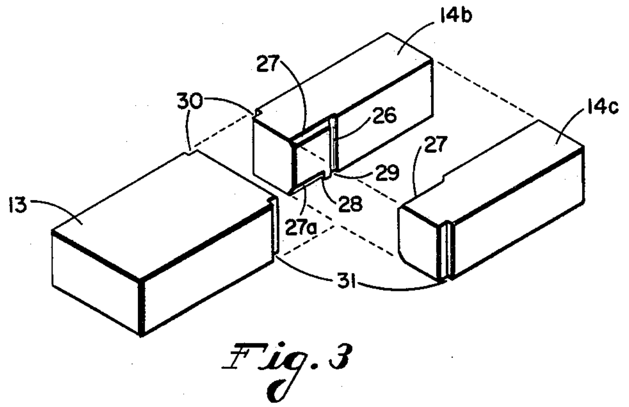
FIG. 3 is a perspective exploded view of the pole pieces of another Hall-effect device of this invention.
Figure 4:
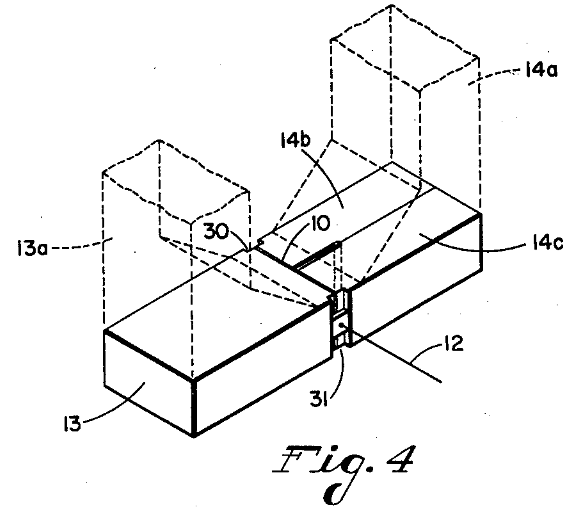
FIG. 4 shows the assembled pole pieces with Hall-effect crystals assembled according to FIG. 3.

FIG. 3 shows one method of fabricating a Hall-effect device embodying the thin Hall wafer structure and the noninductive leads of this invention. The pole pieces 13 and 14 are preferably formed of a ferrite or an inorganic salt of the formula $MFe_2O_4$, where M represents a bivalent metal. Many such salts are magnetic and may be made by sintering powders of the compound to produce low-loss cores suitable for high-frequency applications. The electrical conductivity of such cores is usually quite low. One of the core members, say member 14, is divided lengthwise into two parts as shown at **14*b* and 14*c*. The core members are molded or machined to provide transverse groove 26 and to relieve the corner portions 27 and 27*a* such that when the two core members 14*b* and 14*c* are assembled, as shown in FIG. 4, two continuous channels are formed and extend, parallel to the sides of the pole piece, from opposite edges of the pole face to close-spaced points 28 and 29 on one side of the core. Corner grooves 30 and 31 are also machined in opposed corners of the pole pieces. Next, the Hall wafer is applied to the face of pole 13 and is held in place by an adhesive, while the exposed face of the wafer is lapped to the desired thickness, whereupon the face of fabricated pole piece 14*b*—14*c* is clamped against the wafer. Since the ferrites have low conductivity, molten lead or other highly conductive moldable material may be poured into the grooves 26, 27 and 27*a* to complete the noninductive electrical connections to opposite edges of the wafer 10. Grooves 30 and 31 now provide convenient cavities in which soldered connections 32 can be made to end edges of the wafer. The central portions of the grooves 30 and 31, or the entire length of the grooves, are filled with solder to complete the current connections 11 and 12 to the end edges of the wafer. Thus assembled, the pole pieces are machined or otherwise finished for attachment to the armatures 13*a* and 14*a*, as shown in FIG. 4. Twisted or close-spaced conductors are staked or soldered to the terminals 28 and 29** for the output circuit.

Figure 5:
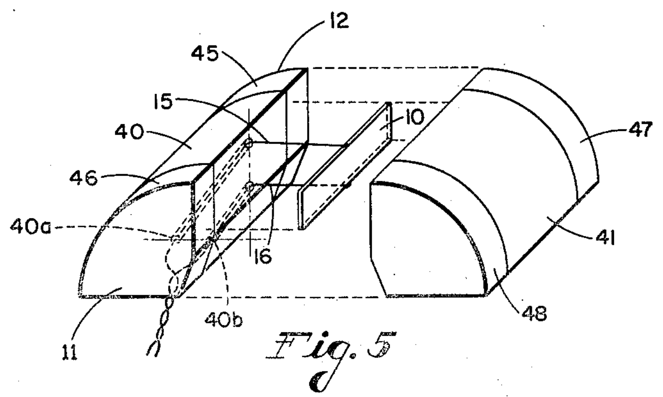
FIG. 5 is an alternative pole piece-Hall crystal constructed according to this invention.

Still another embodiment of the invention is shown in FIG. 5. Here the pole pieces, between which the wafer is sandwiched, are laminated. The pole pieces 40 and 41 are preferably of ferrite composition and are cast in shapes to facilitate attachment of the pole pieces to armatures in a magnetic circuit, as in FIG. 2. Blocks 45 and 46 of non-magnetic conductive metal, such as aluminum, are attached to opposite ends, respectively, of pole piece 40. Corresponding blocks 47 and 48 are attached to opposite ends of pole piece 41. Various adhesives may be employed for making the attachments, the adhesives being chosen for strength as well as insulating properties. Attachment by brazing may be employed, where conductivity of the ferrite is low. Two holes 40a and **40*b* are drilled or cast in ferrite piece 40. The holes in pole piece 40 are disposed in a plane which is perpendicular to the pole face. Lead wires 15 and 16 are threaded through the holes so that the ends of the wires protrude slightly beyond the pole face. The wires may be secured in place with an insulating adhesive. The face of block assembly 40, 45, 46 is then milled or lapped to a smooth planar surface. The face of block assembly 41, 47, 48 is likewise smoothed. The Hall device 10 may be a coherent wafer which is fixed to the pole face, as by an adhesive. Alternatively, the semiconductive material of the Hall wafer may be evaporated in a vacuum and deposited by condensation, through a mask, onto the pole face. The side edges of the wafer overlie a portion at least of the ends of conductors 15 and 16 to complete the electrical connections to the conductors. The end edges of the wafer overlie the faces of conductive blocks 45 and 46 so that when the ends of the wafer are clamped between the blocks 46—48 and 45—47 good electrical contact is made with the ends of the wafer. D.C. leads 11 and 12 are connected to the end blocks. The device of FIG. 5 is capable of extremely thin wafers for high Hall voltage outputs. Since the output conductors 15 and 16 are accurately disposed in a plane parallel to the direction of the field H, no voltage can be induced in the output leads 15 and 16 by changes of magnetic field, regardless of frequency. Accordingly, the signal-to-noise ratio at the terminals 15 and 16** is high.

Many modifications may be made in the structure and in the methods of manufacture of the Hall device of the invention without departing from the scope of the invention as described above and as defined in the appended claims.

What is claimed is:

1. A Hall-effect device comprising a semiconductor material having Hall-effect characteristics, poles of a magnet in contact with opposite faces of said wafer, direct current leads connected to opposite edges of said wafer, and output leads connected to the two remaining edges of said wafer, said output leads being disposed in a plane parallel to the direction of the magnetic field of said magnet to reduce induced voltages in said leads from said field.

2. A Hall-effect device comprising a Hall wafer, magnetic pole pieces pressed against opposite faces of said wafer, lead-in conductors attached to opposite edges of said wafer, one of said leads extending through said pole pieces to a point adjacent the other lead, to minimize the areas of the plane enclosed by said lead-in conductors and to reduce voltages induced in said conductors from said pole pieces.

3. A Hall-effect device comprising a first and a second pole piece, each pole piece comprising a block of magnetic material sandwiched between two blocks of non-magnetic conductive metal, the pole pieces having flat parallel pole faces disposed in closely-spaced parallel relationship, a layer of semiconductor material having Hall-effect properties sandwiched between said pole piece and overlying the faces of the blocks of magnetic and non-magnetic materials, and electrical conductors connected to opposite edges of the portion of said layer overlying the magnetic material and extending in a plane normal to said pole faces to a common point to minimize inductive coupling between the magnetic field of said pole pieces and said conductors.

4. A Hall-effect device comprising a first and a second magnetic pole piece having planar closely-spaced parallel pole faces, one of said pole pieces being divided lengthwise on a plane perpendicular to said pole faces, coextensive grooves extending normal to said faces along said plane and along opposite sides of said one pole piece, a layer of semiconducting material between said pole faces, conductive solder-like material in said grooves and electrically connected at one end to opposite edges of said layer, a channel through said one pole piece for extending one groove to a point adjacent the end of the other groove to provide noninductive output conductors in a plane parallel to the magnetic field of said pole pieces.

5. A Hall-effect device comprising a first pole piece having a planar pole face, a layer of semiconductor material having Hall-effect characteristics adherently affixed to said one pole face, the outer face of said layer being lapped smooth, said second pole piece being pressed against said lapped surface, and output conductors attached to opposite edges of said layer and disposed in a plane parallel to the direction of the magnetic field, one of said conductors being passed through a channel in said one pole face to a point adjacent the other conductor to provide a noninductive lead-out circuit.

References Cited in the file of this patent

UNITED STATES PATENTS 1,822,129 Graig ---------------- Sept. 8, 1931

FOREIGN PATENTS 782,774 Great Britain ---------- Sept. 11, 1957